(12) United States Patent
Oh

(10) Patent No.: US 8,597,018 B2
(45) Date of Patent: Dec. 3, 2013

(54) WELDLESS INJECTION MOLD APPARATUS

(75) Inventor: Hyung Jong Oh, Gwangju (KR)

(73) Assignees: Namdo Mold Co. Ltd., Gwangju (KR); GNST Co., Ltd., Gwangju (KR); Young Jong Oh, Gwangju (KR)

( * ) Notice: Subject to any disclaimer, the term of this patent is extended or adjusted under 35 U.S.C. 154(b) by 46 days.

(21) Appl. No.: 13/341,476

(22) Filed: Dec. 30, 2011

(65) Prior Publication Data

US 2012/0315351 A1 Dec. 13, 2012

(30) Foreign Application Priority Data

Jun. 8, 2011 (KR) .......................... 10-2011-0054942

(51) Int. Cl.
*B29C 45/73* (2006.01)

(52) U.S. Cl.
USPC .......................... 425/547; 425/548; 425/552

(58) Field of Classification Search
USPC ......................... 425/552, 547, 548
See application file for complete search history.

(56) References Cited

U.S. PATENT DOCUMENTS

| 5,376,317 A * | 12/1994 | Maus et al. | 264/40.6 |
| 5,423,670 A * | 6/1995 | Hamel | 425/144 |
| 8,272,865 B2 * | 9/2012 | Higashi et al. | 425/547 |
| 2005/0064061 A1 * | 3/2005 | Eichlseder | 425/548 |
| 2012/0286451 A1 * | 11/2012 | Toda et al. | 264/328.16 |

* cited by examiner

*Primary Examiner* — Tim Heitbrink
(74) *Attorney, Agent, or Firm* — Mitchell P. Brook; McKenna Long & Aldridge LLP

(57) ABSTRACT

A weldless-type injection mold apparatus is provided. The weldless-type injection mold apparatus includes an upper mold, a lower mold engaged to the upper mold to form a cavity for injection-molding of products, a heating unit formed on one side of the cavity of at least one of the lower and upper molds to heat a resin injected into the cavity, a first cooling unit formed at the at least one of the lower and upper molds to prevent the injection mold from being over-heated, and a second cooling unit installed between the heating unit to cool an area surrounding the cavity and an injection-molded product.

3 Claims, 8 Drawing Sheets

WELDLESS INJECTION MOLD APPARATUS

CROSS-REFERENCE TO RELATED APPLICATION

This application claims priority to and the benefit of Korean Patent Application No. 10-2011-0054942, filed on Jun. 8, 2011, the entire content of which is incorporated herein by reference.

BACKGROUND OF THE INVENTION

1. Field of the Invention

Aspects of the present invention relate to an injection mold apparatus, and more particularly, to a weldless-type injection mold apparatus, which can reduce a heating time and a cooling time of an injection mold when heating and cooling the injection mold by forming a heat blocking unit.

2. Description of the Related Art

An injection molding process is to plasticize a polymer resin by applying heat thereto to then inject a molten polymer resin into a mold using a hydraulic pressure and enables mass production of standard products of various sizes.

A general forming process of a polymer resin has problems, such as an aesthetically poor appearance due to a weld line formed by the molten resin in the mold and a low degree of surface gloss.

To solve these problems, a heating molding method is widely used, in which a mold temperature is set to be higher than a melting point of a formed polymer resin. Examples of the heating molding method may include Japanese Patent Publication No. showa 45-22020 (Heating method using hot wind), Japanese Patent Publication No. showa 51-22759 堂 (Heating using electric heater and water cooling), Japanese Patent Publication No. showa 55-109639 (High-frequency inductively heating), Japanese Patent Publication No. showa 57-165229 (Heating by applying vapor into cavity), Japanese Patent Publication No. showa 61-79614 (inserting a heated plate between cavity and core), and Japanese Patent Publication No. hei 4-265720 (Mold surface heating using electrically conductive layer).

However, if the polymer resin is formed by setting a temperature of a mold to be higher than a melting point of polymer resin, a weld line is not formed while enhancing aesthetic appearance, such as gloss. However, a high temperature of the mold extends a cooling time, and the overall forming cycle may be prolonged, thereby lowering the manufacturing efficiency. In particular, since the polymer resin is not separated from the mold after being cooled to lower than the melting point thereof, deformation due to shrinkage may become severer than in the general molding.

As described above, these prior art mold heating methods, which were initially used, are problematic due to a low heating rate for heating the mold surface, so that a heating time is extended and the overall cycle time is prolonged, thereby lowering the manufacturing efficiency. In addition, if the temperature of the mold is elevated to a considerably high temperature, a cooling time may be extended.

In consideration of the foregoing, there have been proposed a mold temperature automatic control system, as disclosed in Korean Patent No. 00811909, a mold cooling system, as disclosed in Korean Patent No. 0167711, a mold temperature control system, as disclosed in Korean Patent No. 0470835, and a system of rapidly heating and cooling a mold in a range of 100° C. to 200° C./min, as disclosed in Korean Patent No. 0701229.

In the disclosed systems, however, cooling and heating of the mold are performed within a very short time. Thus, the foregoing problems are not overcome. In particular, since many cooling lines and hot water supply lines are provided for cooling and heating the mold, the mold has a relatively weak structure and is liable to deform by repeated formation processes. In the conventional mold, a lead is formed at a lower portion of the mold located to correspond to the cavity, thereby reducing heat capacity for heating and cooling. However, if the lead is formed at the lower portion of the mold, the mold may become relatively weak, resulting in creation of cracks due to external impacts or repeated injection molding processes.

Meanwhile, in the conventional weldless-type mold apparatus, the mold may be entirely heated such that heat is diffused to a region other than a cavity region (to an opposite side of the cavity) during heating using a heat source. In addition, as an injection molding time of a product is extended, heat may accumulate in a mold for injection molding.

To address these problems, the inventor of the present invention developed a weldless mold, and filed applications for the developed weldless mold (Korean Patent Application Nos. 2007-045726 and 2009-0104541). After continuous research and development, the inventor has completed the invention.

BRIEF SUMMARY OF THE INVENTION

Aspects of the present invention provide a mold having improved reliability in cooling and heating and capable of preventing heat or cold air from being transferred to a mold base or a fixing plate and a weldless-type mold apparatus using the mold.

Aspects of the present invention further provide a mold and a weldless-type mold apparatus, which can prevent heat from accumulating in the mold during injection molding and reducing the overall cycle time during product molding.

In accordance with one aspect of the present invention, there is provided a weldless-type injection mold apparatus, including an upper mold and a lower mold engaged to the upper mold to form a cavity for injection-molding a product; a heating unit formed at a side adjacent to the cavity of at least one of the upper and lower molds and heating a resin injected into the cavity; a first cooling unit formed at the at least one of the lower and upper molds to prevent the mold from being over-heated; and a second cooling unit installed between the heating unit and the first cooling unit and cooling an area surrounding the cavity and an injection-molded product.

The first cooling unit may include a plurality of vertical cooling flows formed to extend from a bottom surface of the mold to the cavity, the vertical cooling flows may be connected to each other through connection flows, and an inlet and an outlet may be formed on a lateral surface of the lower mold to supply and eject coolant.

In accordance with another aspect of the present invention, there is provided a weldless-type injection mold apparatus, including an upper mold and a lower mold engaged to the upper mold to form a cavity for injection-molding a product, a heating unit formed at a side adjacent to a cavity of at least one of the upper and lower molds to heat a resin injected into the cavity, a first cooling unit formed at the at least one of the lower and upper molds to prevent the injection mold from being over-heated, and a second cooling unit installed between the heating unit to cool a portion surrounding a resin cavity formed by the cavity, wherein the heating unit includes first flows formed on the upper or lower mold in the proximity of the cavity, and a steam supply unit for supplying steam to the first flows using a heat source, the first cooling unit includes a first refrigerant supply unit that continuously supplies coolant through an inlet and an outlet while the product is molded to cool a lower portion of the mold and prevent heat from accumulating in the mold during the injection-molding, and the second cooling unit includes second flows installed between the heating unit and the first cooling unit to be adjacent to the first flows to cool the cavity and the resin injected into the cavity and a second refrigerant supply unit that supplies coolant to the second flows after the injection-molding to cool the resin supplied to the cavity.

As described above, since the mold and the weldless-type injection mold apparatus using the same are capable of continuously cooling the periphery of a cavity of the mold during injection molding, it is possible to prevent heat from accumulating on the mold. In addition, since the mold can be cooled and heated within a short time, the cycle time required in product molding can be reduced. Further, in order to reduce the heat capacity of the mold, a cavity leading from a lower portion of the mold toward the cavity is formed, thereby preventing the mold from being structurally weakened.

Additional aspects and/or advantages of the invention will be set forth in part in the description which follows and, in part, will be obvious from the description, or may be learned by practice of the invention.

BRIEF DESCRIPTION OF THE DRAWINGS

The objects, features and advantages of the present invention will be more apparent from the following detailed description in conjunction with the accompanying drawings, in which.

DETAILED DESCRIPTION OF THE INVENTION

Hereinafter, embodiments of the present invention will be described in detail with reference to the accompanying drawings.

Figure 1:
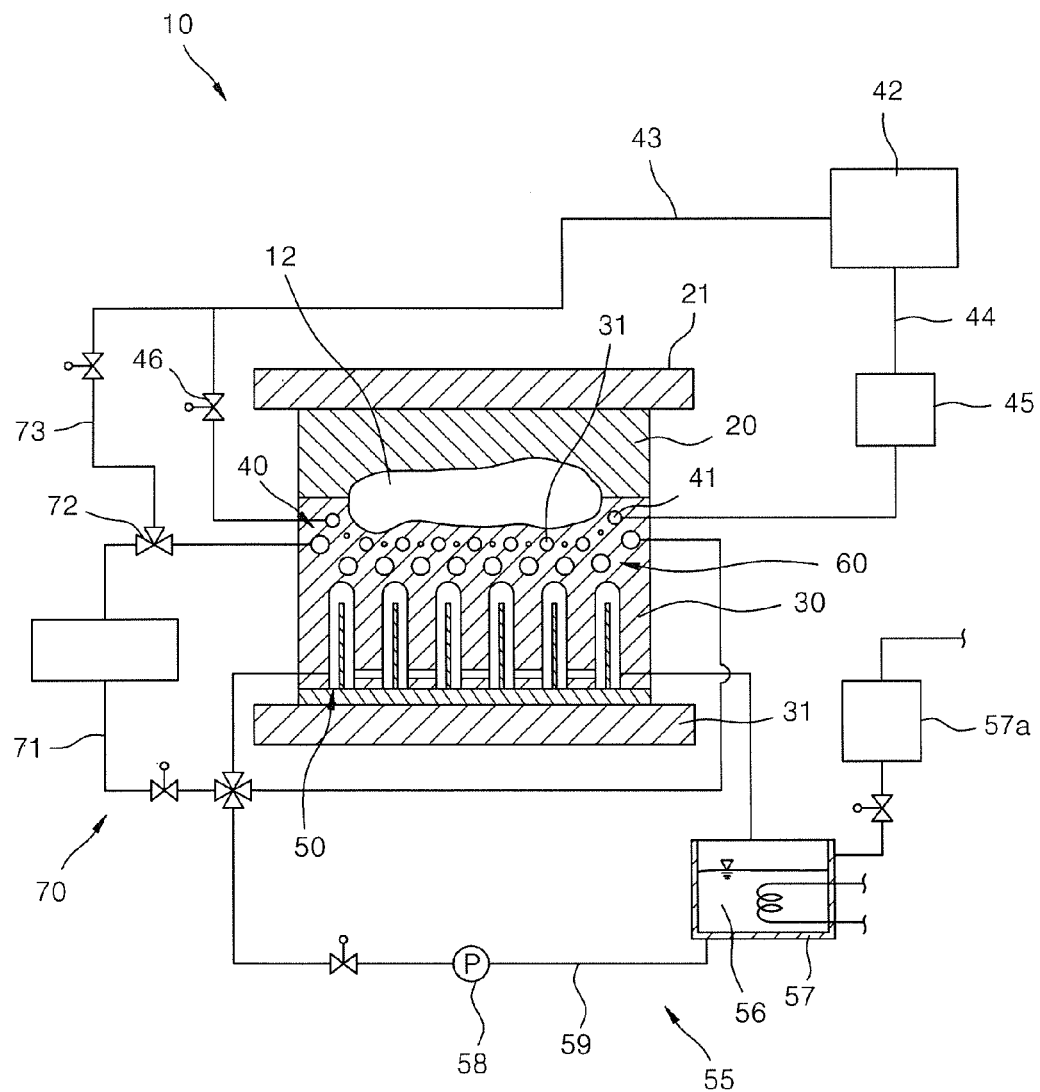
FIG. 1 is a schematic diagram of a weldless-type injection mold apparatus according to an embodiment of the present invention.
Figure 2:
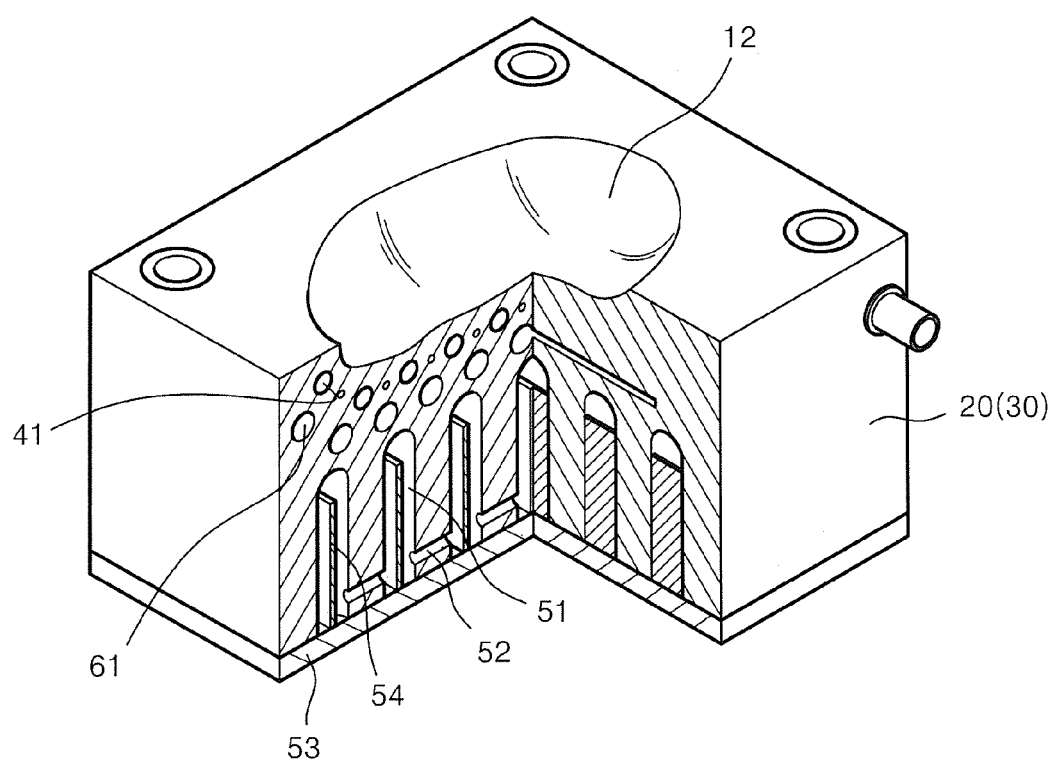
FIG. 2 is a partly exploded perspective view of the weldless-type injection mold apparatus shown in FIG. 1.

A mold according to the present invention and a weldless-type injection mold apparatus using the same are shown in FIGS. 1 and 2.

Referring to FIGS. 1 and 2, the weldless-type injection mold apparatus 10 includes a lower mold 30 fixed on a lower fixing plate 31, and an upper mold 20 combined with the lower mold 30 to form a cavity 12 for injection molding and installed on an upper fixing plate 21.

As shown in FIG. 2, the lower mold 30 includes a heating unit 40, a first cooling unit 50, and a second cooling unit 60. The heating unit 40 is installed at a side adjacent to the cavity 12 and heats an area surrounding the cavity 12 and a resin injected into the cavity 12. The first cooling unit 50 is installed at the upper or lower mold 20 or 30 to prevent the upper or lower mold 20 or 30 from being over-heated due to repeated injection molding processes, and includes a heat blocking unit for preventing heat from being transferred to the outside of the upper or lower mold 20 or 30. The second cooling unit 60 is installed between the heating unit 40 and the first cooling unit 50 and cools an area surrounding the cavity 12 and an injection-molded product.

While the illustrated embodiment shows that the heating unit 40 and the first and second cooling units 50 and 60 are formed in the lower mold 30, the invention is not limited thereto, and the heating unit 40 and the first and second cooling units 50 and 60 may be formed in the upper mold 20.

The aforementioned weldless-type mold according to the present invention and the mold apparatus using the same will now be described in detail.

The heating unit 40 formed in the lower mold 30 of the weldless-type mold includes first fluid flows 41 formed along the track of the cavity 12. The first fluid flows 41 are connected to a boiler 42 for supplying steam or hot water by a first circulating conduit 43. An outlet of each of the first fluid flows 41 is connected to the boiler 42 by a second circulating conduit 44. The second circulating conduit 44 may include a condensed water tank 45 for storing condensed water.

The first circulating conduit 43 may include a first control valve 46 installed to control steam to be supplied to the first fluid flows 41.

The heating unit 40 is not limited to that described in the illustrated embodiment, but may include a heater installed at a side adjacent to the cavity 12. In this case, first fluid flows 41 may be separately formed around the heater.

Figure 3:
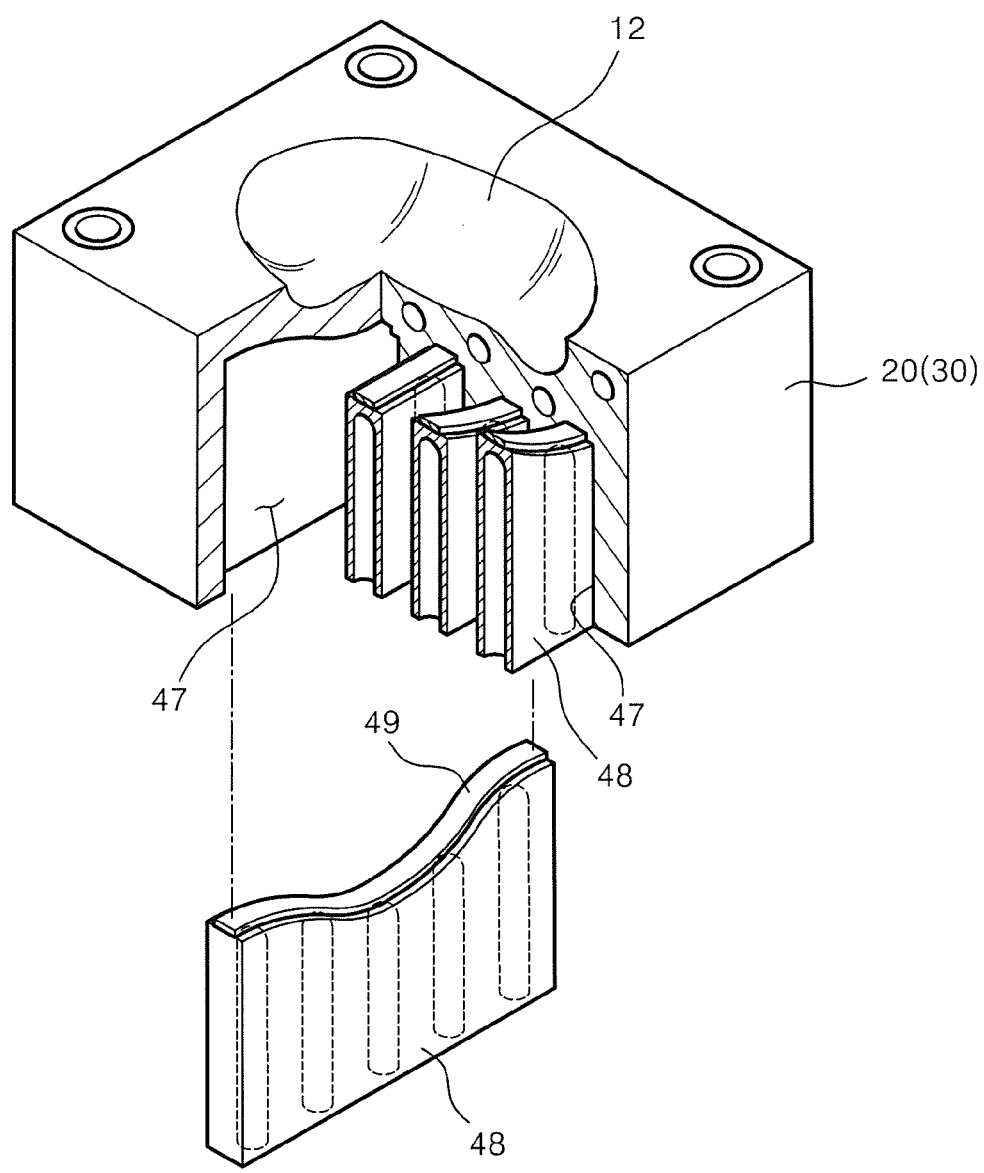
FIG. 3 is a partly exploded perspective view of a first cooling unit of the weldless-type injection mold apparatus shown in FIG. 1.
Figure 4:
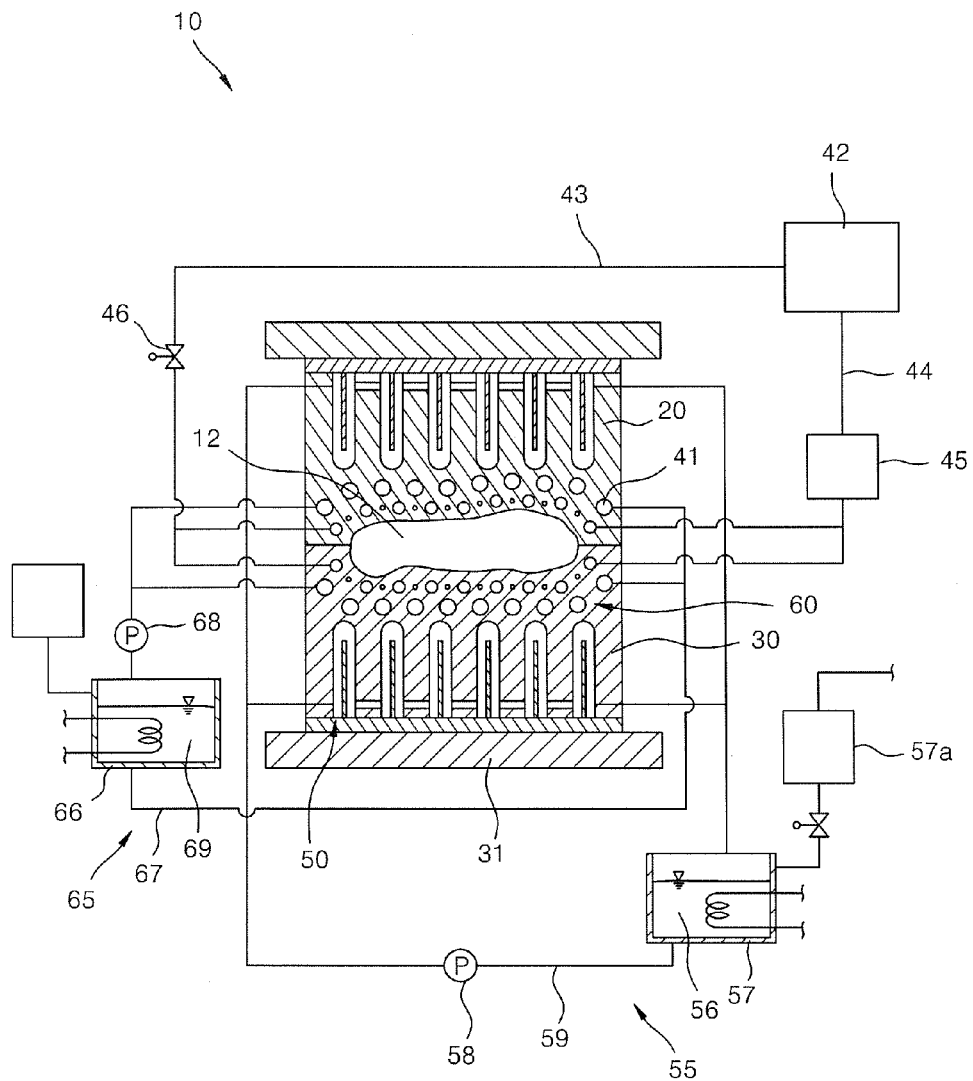
FIG. 4 is a schematic diagram of a weldless-type injection mold apparatus according to another embodiment of the present invention.
Figure 5A:
FIGS. 5A to 5D and FIGS. 6A to 6D are photographs illustrating heated states during injection molding.
Figure 5B:
Figure 5C:
Figure 5D:
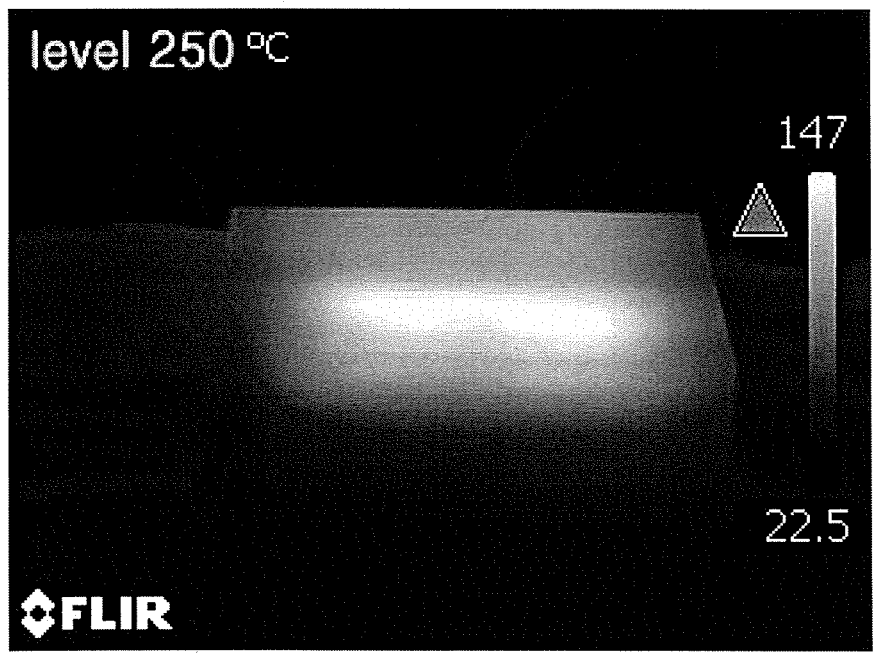
Figure 6A:
Figure 6B:
Figure 6C:
Figure 6D:

Alternatively, as shown in FIG. 3, the heating unit 40 may include a heater installed when the cavity 12 has a relatively complicated structure. In this case, a core recess 47 having a bottom surface (a surface corresponding to the cavity 12) is formed in the same shape as that of the periphery of the cavity 12. The core recess 47 has a core plate 48 having a top surface of the same shape as the bottom surface. A heater 49 for heating an area surrounding the cavity 12 and a resin injected into the cavity 12 is installed on the top surface of the core plate 48. The heater 49 is preferably a band heater. The top surface of the core plate 48 and the bottom surface of the core recess 47 corresponding to the top surface of the core plate 48 may be formed in the same shape as that of the cavity 12, thereby improving heat transfer efficiency. In addition, the core plate 48 has second fluid flows 51 of the first cooling unit 50, which will later be described.

The first cooling unit 50 may be formed in either the upper or lower mold 20 or 30, to prevent the mold from being entirely heated due to repeated injection molding processes. In addition, the first cooling unit 50 may prevent heat capability from increasing due to transfer of heat from the heated mold to a fixing plate (e.g., the lower fixing plate 31) supporting the mold and a peripheral device.

FIGS. 1 to 3 illustrate examples of the first cooling unit 50 formed in the lower mold 30.

Referring to FIGS. 1 to 3, the second fluid flows 51 are spaced a predetermined distance apart from the bottom surface of the lower mold 30 toward the cavity 12. The second fluid flows 51 are connected to each other by communication holes 52. In addition, the second fluid flows 51 are sealed by a blocking plate 53 engaged with the lower mold 30. The blocking plate 53 may have partitioning plates 54 inserted into the second fluid flows 51 to elongate a fluid flow track of the second fluid flows 51. Here, each of the partitioning plates 54 may be shorter than each of the second fluid flows 51.

Meanwhile, the first cooling unit 50 includes a first refrigerant supply unit 55 for continuously supplying coolant to the second fluid flows 51. The first refrigerant supply unit 55 includes a first refrigerant tank 57 in which refrigerant 56 such as coolant or cooling oil is stored, a first pump 58 connecting the refrigerant tank 57 and the first fluid flow 51, and a third circulating conduit 59. The first refrigerant tank 57 is connected to a make-up water tank 57a for refilling the refrigerant 56. In addition, a refrigerant cooling system for cooling the refrigerant may be installed in the first refrigerant tank 57.

The system for cooling the refrigerant may include a system driven by a general cooling cycle, including an evaporator, a condenser, and a compressor.

The first refrigerant supply unit 55 of the first cooling unit 50 is not limited to the type illustrated herein, and the first refrigerant supply unit 55 may have any type as long as it is capable of cooling a mold within a short time. For example, the mold may be cooled by supplying nitrogen to the second fluid flow 51. To this end, the first refrigerant supply unit 55 may include a nitrogen tank and a valve for controlling nitrogen supply.

The second cooling unit 60 is installed between the heating unit 40 and the first cooling unit 50 and cools an area surrounding the cavity 12 and a resin injected into the cavity 12. Third fluid flows 61 are formed between the first fluid flows 41 and the second fluid flows 51. The third fluid flows 61 are located between each of the first fluid flows 41. A second refrigerant supply unit 65 is installed at an end of each of the third fluid flows 61. The second refrigerant supply unit 65 has substantially the same configuration as the first coolant refrigerant supply unit 55. That is to say, the second refrigerant supply unit 65 includes a second refrigerant tank 67 in which refrigerant 66 such as coolant or cooling oil is stored, a second pump 68 connecting the second refrigerant tank 67 and the third fluid flow 61, and a refrigerant circulating conduit 69. In addition, a refrigerant cooling system for cooling the refrigerant may be installed in the second refrigerant tank 67.

Meanwhile, the second refrigerant supply unit 65 may connect a branch conduit 71 branched from the third circulating conduit 59 of the first refrigerant supply unit 55 to the third fluid flows 61 for the purpose of cooling. In this case, the branch conduit 71 may further include a second control valve 72 for controlling refrigerant supply to the third fluid flows 61. The third fluid flows 61 and the branch conduit 71 may be connected to each other by the first circulating conduit 43 of the boiler 42 and a purge conduit 73, so that the refrigerant of third fluid flows 61 may be exhausted when heating is carried out by the heating unit 40. The second control valve 72 may be a three-way valve installed at a connection part of the purge conduit 73 and the branch conduit 71 to supply steam or coolant.

The aforementioned weldless-type mold apparatus according to the present invention operates as follows.

First, in order to elevate temperatures of the upper and lower molds 20 and 30, steam may be supplied from the boiler 42 of the heating unit 40 to the first fluid flows 41 through the first circulating conduit 43, or a band heater 49 may be heated by supplying power to the band heater 49. Here, the band heater 49 is formed on the top surface of the core plate 48 shaped in conformity with the cavity 12, the cavity 12 of the mold can be heated within a short time.

Here, in a state in which the upper and lower molds 20 and 30 are engaged with each other, a resin is injected into the cavity 12, thereby molding a product. During this process, refrigerant is continuously supplied to the second fluid flows 51 of the first cooling unit 50 to cool the lower mold 30 or a lower portion of the upper mold 20. The cooling may prevent heat from accumulating on the upper mold 20 and the lower mold 30 during repeated injection molding processes.

If the forming is completed in such a manner, while blocking the steam from being supplied to the first fluid flows 41 or the power from being supplied to the band heater 49, coolant is supplied to the third fluid flows 61 to cool an area surrounding the cavity 12 and the molded resin.

After the upper and lower molds 20 and 30 are disengaged from each other and the molded product is extracted, the upper and lower molds 20 and 30 are engaged with each other for further injection molding. Then, steam is supplied to the first fluid flows 41 formed in the upper and lower molds 20 and 30 to heat the upper and lower molds 20 and 30. During this process, steam may be supplied to the second fluid flows 51 or air may be supplied by a separate pneumatic means, thereby ejecting the refrigerant filling the second fluid flows 51. While heating is performed by the heating unit 40, steam may separately supplied to the second fluid flows 51.

In order to prevent heat from accumulating in the upper mold 20 or the lower mold 30 during injection molding, the first cooling unit 50 is provided. Thus, it is possible to prevent heat from accumulating in the mold due to repeated injection molding processes.

The inventor of the present invention obtained images of the upper mold and the lower mold during injection molding using a forward-looking infrared (FLIR) camera, and FIGS. 5A to 5D and FIGS. 6A to 6D illustrate the heated states during injection molding.

As evident from the photographs, heat was accumulated around the cavity while heat was not accumulated in upper and lower molds. That is to say, since heat is not transferred to a lower portion of the cavity, the heat capacity for the overall injection molding process is not so high.

Since heat accumulation is prevented in such a manner, a cooling time and a heating time for injection molding, specifically, the cooling time, can be reduced, thereby shortening the overall cycle time required for injection-molding a product, ultimately enhancing the manufacturing efficiency.

As described above, the weldless-type mold apparatus according to the present invention has been described with regard to molding based on a rapid thermal process performed on a polymer resin, and a device for controlling a polymer resin mold temperature. However, the rapid thermal process and the device for controlling a polymer resin mold temperature according to the present invention can also be applied to other types of molding, including transfer molding, compressive molding, reaction molding, blow molding, and thermoforming. In addition to the conventional molding methods, injection compressing, locally heated-pressed molding, gas pressed molding, gas assisted molding, cavity molding, sandwiched molding, dichroic molding, in-mold molding, push-pull molding, fast molding, and so on.

While the invention has been described in connection with certain exemplary embodiments, it will be understood by those skilled in the art that the invention is not limited to the disclosed embodiments, but rather is intended to cover various modifications included within the spirit and scope of the appended claims and equivalents thereof.

What is claimed is:

1. A weldless injection mold apparatus, comprising:
   an upper mold and a lower mold engaged to the upper mold to form a cavity for injection-molding a product;
   a heating unit situated at a side adjacent to the cavity of at least one of the upper and lower molds and heating a resin injected into the cavity;
   a first cooling unit situated outside at least one of the lower and upper molds to prevent the mold from being over heated and to form a heat blocking unit to prevent heat from being transferred outside the molds;

a second cooling unit installed between the heating unit and the first cooling unit and cooling an area surrounding the cavity and an injection-molded product;

wherein the heating unit operates to heat the periphery of the cavity to a predetermined temperature before the upper and lower molds are engaged with each other and a resin is injected into the cavity;

wherein the heating unit stops the heating operation and the second cooling unit operates to cool the periphery of the cavity and the injected resin when the injection of the resin is completed;

wherein the second cooling unit stops the cooling operation after the upper and lower molds are disengaged from each other and a molded product is extracted; and wherein the first cooling unit continuously operates to cool the mold during the entire injection mold process.

2. The weldless injection mold apparatus of claim 1, wherein the first cooling unit includes a plurality of vertical cooling flows formed to extend from a bottom surface of the mold to the cavity, the vertical cooling flows are connected to each other through connection flows, and an inlet and an outlet are formed on a lateral surface of the lower mold to supply and eject coolant.

3. A weldless injection mold apparatus, comprising:

an upper mold and a lower mold engaged to the upper mold to form a cavity for injection-molding a product;

a heating unit formed at a side adjacent to the cavity of at least one of the upper and lower molds and heating a resin injected into the cavity;

a first cooling unit formed at the at least one of the lower and upper molds to prevent the mold from being overheated;

a second cooling unit installed between the heating unit and the first cooling unit and cooling an area surrounding the cavity and an injection-molded product; and wherein the heating unit has a core recess formed in the lower mold and having a bottom surface shaped to correspond to the cavity, a core plate is inserted into the core recess, the core plate having a top surface shaped to correspond to the bottom surface, and a heater is installed on the top surface of the core plate to heat a portion surrounding the cavity and a resin injection-molded into the cavity.

* * * * *